US012578999B2

(12) United States Patent
Beam et al.

(10) Patent No.: US 12,578,999 B2
(45) Date of Patent: Mar. 17, 2026

(54) AUTOMATED RIGHTSIZING OF CONTAINERIZED APPLICATION WITH OPTIMIZED HORIZONTAL SCALING

(71) Applicant: Gram Labs, Inc., Arlington, VA (US)

(72) Inventors: Bradley Joseph Beam, Olathe, KS (US); Jeremy Michael Gustie, Williston, VT (US); Christopher Marc Larson, McLean, VA (US); Thibaut Xavier Perol, Arlington, VA (US); John Daniel Platt, Washington, DC (US)

(73) Assignee: CLOUDBOLT SOFTWARE, INC., Rockville, MD (US)

( * ) Notice: Subject to any disclaimer, the term of this patent is extended or adjusted under 35 U.S.C. 154(b) by 0 days.

(21) Appl. No.: 19/029,511

(22) Filed: Jan. 17, 2025

(65) Prior Publication Data

US 2025/0165298 A1     May 22, 2025

Related U.S. Application Data

(63) Continuation of application No. 18/736,094, filed on Jun. 6, 2024, now abandoned.

(60) Provisional application No. 63/507,077, filed on Jun. 8, 2023.

(51) Int. Cl.
     *G06F 9/50*     (2006.01)

(52) U.S. Cl.
     CPC .................................. *G06F 9/5027* (2013.01)

(58) Field of Classification Search
     None
     See application file for complete search history.

(56) References Cited

U.S. PATENT DOCUMENTS

| | | | |
|---|---|---|---|
| 9,043,798 B2 * | 5/2015 | Calcaterra ............. | G06F 9/5011 |
| | | | 718/104 |
| 10,776,172 B1 * | 9/2020 | Rachamadugu ...... | G06F 9/5077 |
| 10,901,788 B2 * | 1/2021 | Venkadasamy ..... | G06F 11/3024 |
| 10,963,311 B2 * | 3/2021 | Walsh ................... | G06F 9/5016 |
| 12,112,287 B1 * | 10/2024 | Kwan .............. | G06Q 10/06313 |
| 12,147,838 B1 * | 11/2024 | Wellum .............. | G06F 9/45533 |
| 2013/0346969 A1 * | 12/2013 | Shanmuganathan ........................ | |
| | | | G06F 9/4856 |
| | | | 718/1 |
| 2019/0286486 A1 * | 9/2019 | Ma ........................ | G06F 9/5027 |

(Continued)

OTHER PUBLICATIONS

Imdoukh et al.; "Machine learning-based auto-scaling for containerized applications"; Neural Computing and Applications (2020) 32: 9745-9760; https://doi.org/10.1007/s00521-019-04507-z; Springer-Verlag London Ltd., part of Springer Nature 2019; (Imdoukh_2019. pdf; pp. 9745-9760) (Year: 2019).*

(Continued)

*Primary Examiner* — Hiren P Patel
(74) *Attorney, Agent, or Firm* — Oblon, McClelland, Maier & Neustadt, L.L.P.

(57) ABSTRACT

A method for rightsizing an application, including analyzing, via processing circuitry, metrics from containers; determining, via the processing circuitry, a resource allocation and a target resource utilization for an application workload based on the metrics; and configuring, via the processing circuitry, the application workload based on the resource allocation, the target resource utilization, and the metrics.

19 Claims, 3 Drawing Sheets

Initial configuration

Vertical scaling

Horizontal scaling

(56) References Cited

U.S. PATENT DOCUMENTS

| | | | | |
|---|---|---|---|---|
| 2020/0082316 | A1* | 3/2020 | Megahed | G06F 9/505 |
| 2020/0174839 | A1* | 6/2020 | Venkadasamy | G06N 20/00 |
| 2020/0322226 | A1* | 10/2020 | Mishra | G06F 11/3006 |
| 2020/0401456 | A1* | 12/2020 | Sivak | G06F 9/45558 |
| 2021/0357255 | A1* | 11/2021 | Mahadik | G06F 11/3006 |
| 2022/0114020 | A1* | 4/2022 | Akkapeddi | G06F 9/5027 |
| 2022/0383324 | A1* | 12/2022 | Sheshadri | H04L 41/16 |
| 2022/0413935 | A1* | 12/2022 | Kantamneni | G06F 9/5077 |
| 2022/0417173 | A1* | 12/2022 | Jijumon | H04L 43/0852 |
| 2023/0050796 | A1* | 2/2023 | Ghergu | G06F 9/505 |
| 2023/0153170 | A1* | 5/2023 | An | G06F 9/4856 718/104 |
| 2023/0315537 | A1* | 10/2023 | Samareh Abolhasani | G06F 11/3438 718/104 |
| 2023/0401541 | A1* | 12/2023 | Housseini | G06Q 10/06314 |
| 2024/0004711 | A1* | 1/2024 | Young, Jr. | G06F 9/5005 |
| 2024/0320057 | A1* | 9/2024 | Dunne | G06F 9/5005 |
| 2024/0356862 | A1* | 10/2024 | Sandgren | G06F 9/5022 |
| 2024/0370307 | A1* | 11/2024 | You | G06F 9/5072 |
| 2024/0394110 | A1* | 11/2024 | Coviello | G06F 9/505 |
| 2024/0419470 | A1* | 12/2024 | Beveridge | G06F 9/505 |
| 2025/0181412 | A1* | 6/2025 | Wu | G06F 9/5055 |
| 2025/0310202 | A1* | 10/2025 | Atur | H04L 41/0897 |

OTHER PUBLICATIONS

Ivanovic et al.; "Efficient evolutionary optimization using predictive auto-scaling in containerized environment"; Applied Soft Computing 129 (2022) 109610; https://doi.org/10.1016/j.asoc.2022.109610; 2022 Elsevier B.V.; (Ivanovic_2022.pdf; pp. 1-14) (Year: 2022).*

Abdullah et al.; "Burst-Aware Predictive Autoscaling for Containerized Microservices"; IEEE Transactions on Services Computing, vol. 15, No. 3, May/Jun. 2022; Digital Object Identifier No. 10.1109/TSC.2020.2995937; (Abdullah_2020.pdf; pp. 1448-1460) (Year: 2020).*

Ye et al.; "An Auto-scaling Framework for Containerized Elastic Applications"; 2017 3rd International Conference on Big Data Computing and Communications; 2017 IEEE; DOI 10.1109/BIGCOM.2017.40 (Ye_2017.pdf; pp. 422-430) (Year: 2017).*

Imdoukh et al.; "Machine learning-based auto-scaling for containerized applications"; Neural Computing and Applications (2020) 32: 9745-9760; https://doi.org/10.1007/s00521-019-04507-z; (Imdoukh_2020.pdf) (Year: 2020).*

Rossi et al.; "Horizontal and Vertical Scaling of Container-based Applications using Reinforcement Learning"; 2019 IEEE 12th International Conference on Cloud Computing (CLOUD); DOI 10.1109/CLOUD.2019.00061; (Rossi_2019.pdf) (Year: 2019).*

* cited by examiner

AUTOMATED RIGHTSIZING OF CONTAINERIZED APPLICATION WITH OPTIMIZED HORIZONTAL SCALING

CROSS-REFERENCE TO RELATED APPLICATIONS

The present application is a continuation of U.S. patent application Ser. No. 18/736,094, filed Jun. 6, 2024, which claims priority to U.S. Provisional Application No. 63/507, 077, filed Jun. 8, 2023, each of which are incorporated herein by reference in their entirety for all purposes.

BACKGROUND

Field of the Disclosure

The present disclosure relates to orchestration of containerized applications.

Description of the Related Art

Containerized applications can be deployed using container orchestration services. Computing resources can be allocated to applications manually based on best practices for container performance. These best practices should accommodate unexpected changes in application activity and container usage while reducing excessive or unnecessary costs for maintaining the application environment.

The foregoing "Background" description is for the purpose of generally presenting the context of the disclosure. Work of the inventors, to the extent it is described in this background section, as well as aspects of the description which may not otherwise qualify as prior art at the time of filing, are neither expressly or impliedly admitted as prior art against the present disclosure.

SUMMARY

The foregoing paragraphs have been provided by way of general introduction, and are not intended to limit the scope of the following claims. The described embodiments, together with further advantages, will be best understood by reference to the following detailed description taken in conjunction with the accompanying drawings.

In one embodiment, the present disclosure is directed to a method for rightsizing an application, comprising analyzing, via processing circuitry, metrics from containers in the application; determining, via the processing circuitry, a resource allocation and a target resource utilization for an application workload based on the metrics; and configuring, via the processing circuitry, the application workload based on the resource allocation, the target resource utilization, and the metrics.

In one embodiment, the present disclosure is directed to a device comprising processing circuitry configured to analyze metrics from containers in an application, determine a resource allocation and a target resource utilization for an application workload based on the metrics, and configure the application workload based on the resource allocation, the target resource utilization, and the metrics.

In one embodiment, the present disclosure is directed to a non-transitory computer-readable storage medium for storing computer-readable instructions that, when executed by a computer, cause the computer to perform a method, method comprising analyzing metrics from containers in an application; determining a resource allocation and a target resource utilization for an application workload based on the metrics; and configuring the application workload based on the resource allocation, the target resource utilization, and the metrics.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION

Figure 1:
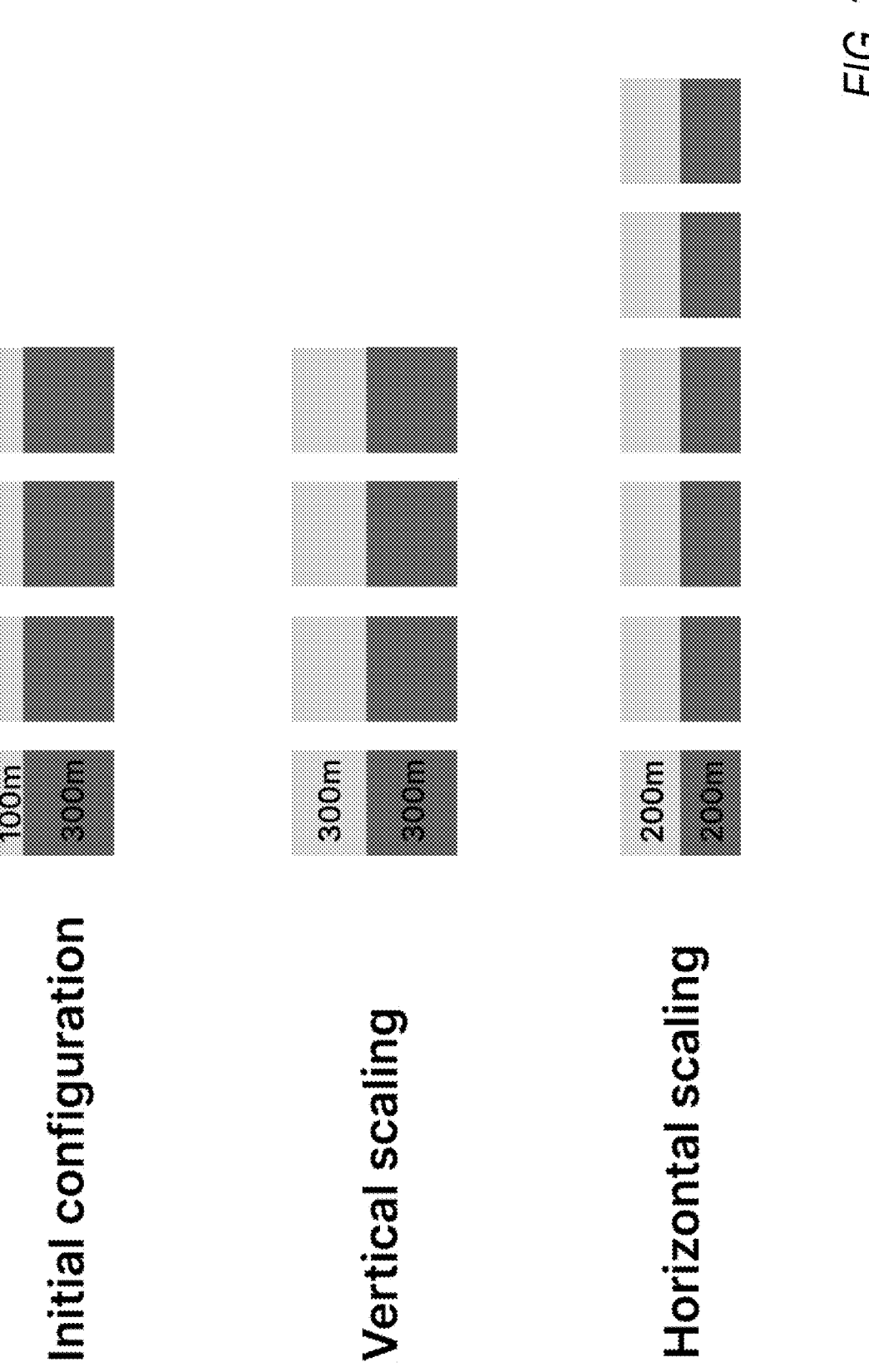
FIG. 1 is a schematic of how resources can be added to a workload with either vertical or horizontal scaling, according to an exemplary embodiment of the present disclosure.

The terms "a" or "an", as used herein, are defined as one or more than one. The term "plurality", as used herein, is defined as two or more than two. The term "another", as used herein, is defined as at least a second or more. The terms "including" and/or "having", as used herein, are defined as comprising (i.e., open language). Reference throughout this document to "one embodiment", "certain embodiments", "an embodiment", "an implementation", "an example" or similar terms means that a particular feature, structure, or characteristic described in connection with the embodiment is included in at least one embodiment of the present disclosure. Thus, the appearances of such phrases or in various places throughout this specification are not necessarily all referring to the same embodiment. Furthermore, the particular features, structures, or characteristics may be combined in any suitable manner in one or more embodiments without limitation.

In one embodiment, the present disclosure is directed to scaling of containers used for deployment of applications. Deployment can refer to the configuration of machines to host and execute applications or services in a production environment. The machines can be hosted by one or more physical hardware devices (e.g., servers). In one embodiment, the machines can be virtual machines. A machine can run or host more than one container. A container is a running environment for a process, the process being one component or function related to the application. A container can include dependencies and libraries required to run the application. Containers can further be grouped and organized into pods or other structures to enable more efficient deployment and communication as a deployment environment increases in size. For example, a pod can include a container for running an application as well as containers for initializing and terminating an environment related to the application. A pod is the smallest executable unit in a Kubernetes cluster, which is a popular system for deploying and managing containerized applications. A pod can be created and configured with the computing resources (e.g., processors, memory, ephemeral storage) needed to run an application. An application can consist of one or more workloads, wherein each application workload can use or require a different set of resources in order to accomplish a task associated with the application. In some implementations, an application workload can be distributed across a number of pods. Each pod can execute or process a portion of the traffic for the workload. Machines can be organized in clusters, wherein each machine can be a node in a cluster. Nodes or machines in a cluster can utilize the same network and can communicate with each other to host a number of services and applications.

Pod configuration and deployment is typically dependent on the anticipated resource usage for an application or service. Resources can include, but are not limited to, CPU resources and memory capacity. The resources are typically defined by a quantity for a resource type, such as a number of CPU cores or bytes of memory. The available resources allocated to a pod can be configured when the pod is created. A target resource utilization can be set for a workload. The target resource utilization can refer to how much of the available resources is utilized by a pod before new replicas of the pod should be added to the workload to increase the processing capability of the workload. The target resource utilization can be configured based on the capacity of the pods and additional factors related to capacity or resource usage for the workload, as will be described in further detail herein. In one embodiment, the target resource utilization can be a percentage of total available resources allocated to a workload rather than the full resource allocation for reasons that will be described herein. The resource allocation and the target resource utilization can be manually configured when a workload is deployed based on expected resource demands of the application or service. Each workload of an application can be configured with a different resource allocation and target resource utilization. According to one example, the expected resource demands can be based on previous and/or expected activity and resource usage related to the application.

A workload can be created or scaled with excess resources to handle increases in resource demand. Overprovisioning can refer to allocating more resources to a pod than is typically needed for the workload. The excess resources, or headroom, can be used to handle unexpected increases in resource demand. Overprovisioning can help ensure that the workload is reliable and will perform consistently even when there are unexpected increases in resource demand. However, allocating too many resources to a workload can result in resources that are never used, even in the case of sudden increases in traffic. These resources (headroom) are thus wasted and confer unnecessary monetary and other costs to a host in order to maintain the workload. A workload should be configured to handle expected and unexpected changes in resource demands while minimizing excessive or unnecessary server costs. The target resource utilization of a workload can determine how much headroom is available in the workload and when additional replicas should be added to a workload to maintain the necessary headroom. Thus, workload resource allocation and target resource utilization are two important parameters that can determine how a workload is deployed and managed for long-term reliability and success.

The total resource availability for a workload can be modified as the application or service is running in order to adjust for varying usage. Reconfiguring a workload to adjust resources can be referred to as scaling. In Kubernetes, autoscalers can be implemented to manage workloads. Other container orchestration services and hierarchies are also compatible with the systems and methods described in the present disclosure.

Resource usage for an application or service can change over time. The changes can be gradual, e.g., as a result of an expanding userbase, or can be immediate, as a result of a single event. For example, a website can experience increases and decreases in website traffic. Specific pages or functions on the website can also experience increases and decreases in traffic or usage over time. These increases in traffic can be periodic and predictable or can be random. The workloads that are deploying the website should be able to handle increases in traffic, including sudden spikes, and maintain normal website functionality without exposing users to lagging or connection loss. One strategy for handling such increases in traffic is to scale the workload vertically by increasing the resource allocation to each pod in the workload. Each pod can thus handle more traffic. For example, the memory available in a pod can be increased or decreased based on the memory demands of applications hosted by the pod. In some embodiments, vertical scaling can include restarting and/or recreating the pod in order to modify the resource allocation. When the pod is recreated, it is temporarily taken offline and its functions and storage are offloaded to other pods in the workload. If resource demand decreases, the workload can be downscaled, and the pods can be reconfigured with fewer resources to reduce waste. Alternatively, the increases in traffic can be handled by scaling the workload horizontally. Horizontal scaling refers to changing the number of pods in the workload by creating or destroying pod replicas, which have the same configurations as the existing pods in the workload. When an increase in traffic occurs, pod replicas can be added to the workload. The resource allocation of each pod replica and the target resource utilization of the workload stays the same. Horizontal scaling allows the workload to be distributed across more pod replicas, thus decreasing the load on each pod so that the average resource utilization of the workload remains comparable to the target resource utilization. Similarly, if resource demand decreases, pod replicas that are no longer needed can be destroyed to downscale the workload.

FIG. 1 illustrates a configuration of a workload, according to one embodiment of the present disclosure. In an initial configuration, the resource usage of each pod can be close to the total allocated resource, leaving little headroom. For example, each pod can use 300 m of a resource, leaving 100 m of available headroom. The resource usage may be greater than a target resource utilization per pod. Vertical or horizontal scaling can be used to increase the headroom of each pod. In vertical scaling, each pod can be reconfigured such that the total resource allocation of each pod can be increased to 600 m. The resource usage of each pod can stay the same (300 m), resulting in increased headroom (300 m) per pod. The new headroom can provide additional resource in case of further increases in resource demand. In horizontal scaling, additional pods can be added to the cluster, wherein each additional pod has the same resource allocation (400 m) as in the initial configuration of the workload. Work can be redistributed across the pods in the initial configuration and the additional pods such that the resource usage of each pod is decreased from 300 m to 200 m. As a result, the headroom of each pod increases from 100 m to 200 m. In both cases, the total resource usage after scaling is 1200 m and the total headroom is 1200 m. The vertical and horizontal scaling methods can result in the resource usage of each pod matching a target resource utilization more closely.

Vertical and horizontal scaling can be utilized in different scenarios. For example, vertical scaling can be preferable for cost savings in environments where it can cost less to upgrade existing pods than it would to add additional pods. Alternatively, horizontal scaling can be preferable for rapid changes because horizontal scaling does not require pods to be restarted and can be faster than vertical scaling. Horizontal scaling can also be useful for long-term changes in a workload. Increasing the number of pods in a workload can make the workload more robust. For example, if the workload is distributed across more pods, then the failure of a single pod has a smaller impact on the overall performance of the workload. Data and/or functions can be rerouted to and restreamed from other pods easily.

Combining traditional vertical and horizontal scaling methods to configure a workload can result in thrashing, wherein the horizontal and vertical pod scalers continuously override each other and neither accomplishes its goals for configuring the workload. For example, a change in the workload due to vertical scaling can cause the horizontal scaler to modify the workload in a way that counters the effect of vertical scaling. The horizontal scaling in turn triggers further vertical scaling that can counter the effect of the horizontal scaling. The two methods are not compatible in their traditional configurations, resulting in only one of the two being used to manage active workloads with deployed containers. There is therefore a need to develop systems and methods for effective combination of vertical and horizontal scaling techniques in order to take advantage of the benefits of each scaling method and overcome the disadvantages of each scaling method.

In one embodiment, the present disclosure is related to systems and methods for dynamically allocating resources and determining target resource utilization in order to implement both vertical scaling and horizontal scaling for a workload. The vertical and horizontal scaling can be automatic. The scaling methods of the present disclosure can use the same metrics to inform both vertical scaling and horizontal scaling. In one embodiment, machine learning can be used to collect and analyze these metrics. The machine learning approach can be used to determine how much the workload should be scaled vertically and horizontally to meet dynamic requirements related to resource utilization. In one implementation, the configuration of vertical scaling and horizontal scaling can be interdependent to enable the integration of the two methods.

In one embodiment, the vertical scaling method of the present disclosure can include automatically adjusting a target resource utilization for a workload in addition to modifying resource allocation for the workload. Target resource utilization and other utilization metrics are typically manually configured by an administrator of a containerized environment. The target resource utilization can be configured based on a number of factors including, but not limited to, a desired amount of headroom, or unused resources; resource usage; a maximum container size; a number of containers; cost considerations; power considerations; total available storage considerations; desired throughput and/or latency. In some embodiments, the target resource utilization can also be configured based on anticipated changes to the workload. Any subsequent scaling, both vertical and horizontal, is dependent on the configured target resource utilization. Setting a target resource utilization too high or too low can result in a suboptimal environment. For example, setting a target resource utilization too high can result in the workload running out of compute resources when a sudden increase in traffic occurs because each pod is operating at maximum or near-maximum capacity. Setting the target resource utilization too low can result in unused or wasted resources for each pod, which can be expensive and power-intensive.

According to some embodiments, the present disclosure includes methods for implementing a dynamic target resource utilization. The dynamic target resource utilization can be automatically evaluated and updated while an application is running and can result in a more responsive cluster that reduces wasted resources. In some embodiments, the dynamic target resource utilization can be configured without manual input from a user. In some embodiments, user input, such as how frequently to reconfigure resource settings, how to balance reliability and savings, minimum or maximum allowed values for resource settings, and minimum or maximum allowed increments for changes to resource settings can be used in determining the dynamic target resource utilization. The dynamic target resource utilization can be updated based on the resource allocation for a workload and resource usage of the workload over time. According to one embodiment, vertical scaling in the present disclosure can include solving a combined optimization problem in order to scale the resources allocated to a pod and modify the target resource utilization of the workload. The dynamic target resource utilization can be adjusted in tandem with the modification of resource allocation for the workload in order to leave horizontal autoscaling behavior unaltered and prevent thrashing or similar incompatibilities between vertical and horizontal scaling. In one embodiment, the dynamic target resource utilization can be determined by collecting, aggregating, and analyzing metrics of an application or application workload in order to identify unused headroom. Unused headroom can refer to resources that are not used when the workload is deployed and is thus wasted. The identification of unused headroom can be used to determine how resources should be allocated to pods and a more appropriate target resource utilization that provides sufficient but not excessive or wasted headroom.

In one embodiment, the metrics can be collected at a container or pod level and aggregated for all replicas in a workload. The metrics can be standardized across all containers or can be container-specific or pod-specific. The metrics can include resource usage metrics and/or metrics related to configuration and activity of the containers. The metrics can include, but are not limited to, CPU and/or memory allocation, current target resource utilization, CPU usage, memory usage, scheduling metrics, scheduling history, execution history, number of replicas, container condition, resource requests, resource limits, status, status history, maximum and minimum allowable replicas, number and type of metrics used by a horizontal autoscaler, time (e.g., time of day, day of week, etc.), throughput, latency, error rate, network usage, node properties (e.g., number of cores, processor type, available capacity), metrics related to under-resourcing, such as throttling and out-of-memory events. Any additional container-related metrics, including, but not limited to, those typically collected and exposed by the Kubernetes platform, are also compatible with the present method. The metrics can be aggregated across at least one pod and can be analyzed as an aggregated collection in order to accurately assess the cluster. In one embodiment, the metrics can include application-specific metrics and/or information about the applications and services hosted by the containers. For example, the type of application, the scope of the application, a number of accesses or requests made to the application, types of accesses or requests, queue depth, deployment information, scheduling information, etc. Application-specific metrics can be useful in determining the necessary resource allocation for a cluster as well as for anticipating spikes in activity that would require more resource allocation.

In one embodiment, the metrics can be used to create a time series database to monitor and analyze resource usage over time. The time window over which the metrics are collected and aggregated can be set according to a user input or can be automatically determined based on changes in the metrics over time. The time series data can be analyzed to identify unused headroom, as well as determine how much headroom should be allocated in a workload based on the metrics. Patterns and changes in the metrics can be identified in order to characterize the behavior of the workload and predict future resource usage. In one embodiment, the analysis of the metrics can include identification of spikes in traffic or access and/or spikes in resource demand. Data related to the previous spikes can include, for example, a timing, a duration, and/or a context (e.g., activity leading up to or in the aftermath of a spike). The analysis of the metrics can be used to identify unused or excessive headroom that was previously allocated to the pods and determine how to convert the unused headroom to properly utilized resources and headroom in the workload and/or cluster.

In one embodiment, machine learning (e.g., a machine learning model) can be used to identify unused headroom as well as solve an optimization problem to determine an updated resource allocation and updated target resource utilization for a pod based on the metrics and the identified unused headroom. For example, a workload can have an initial resource allocation $r_1$ and initial target resource utilization $\tau_1$. Excess headroom can be identified in the workload based on analysis of the metrics. The pods can be reconfigured with a new resource allocation $r_2$ and a new target resource utilization $\tau_2$ in order to reduce the excess headroom. The new resource allocation $r_2$ and new target resource utilization $\tau_2$ can provide for a predicted headroom, the predicted headroom being different from the headroom that was provided by the initial resource allocation $r_1$ and target resource utilization $\tau_1$. The predicted headroom can be predicted based on analysis of the metrics. According to one embodiment, the new target resource utilization $\tau_2$ can be determined as a function of the initial resource allocation $r_1$, the initial target resource utilization $\tau_1$, and the new resource allocation $r_2$. In one embodiment, the machine learning approach can include a multivariate analysis. The multivariate analysis can be applied to the collected metrics over time to determine how to scale the workload by modifying both the resource allocation and the target resource utilization. According to one embodiment, the machine learning approach can include analysis of previous scaling activity to determine future scaling activity. Dynamically adjusting the target resource utilization while the cluster is active can result in a more accurate target utilization that eliminates unused headroom while still enabling pods to handle sudden changes in activity. Scaling both the total allocated resources and the target resource utilization can result in better distribution of activity across a number of pods while maintaining necessary headroom for each pod.

In one embodiment, the workload configurations, including the resource allocation, the target resource utilization, and the headroom can be determined based on properties of the workload or environment. For example, the overhead required to create new pods in a cluster can be a factor in determining how to scale the pods. It may be more efficient to increase the resource availability for a workload via vertical scaling in order to minimize the number of new instances that will be created during operation. There are a number of configurations and parameters that can be used to determine how to scale the workload. The configurations can be provided to the models and systems of the present disclosure as quantifiable user inputs based on the needs of users or administrators of an application. Examples of configurations or parameters can include, but are not limited to, a desired cost for deploying and maintaining the workload or application, an acceptable failure rate, a response time or other metric of speed, a capacity (e.g., a user capacity, a maximum traffic capacity). For example, a cost ceiling can be implemented for deployment of the containerized environment. The cost ceiling can represent a maximum amount that a company is willing to pay to maintain their website, which is hosted in the containerized environment. Maintaining and configuring the environment can be associated with varying monetary costs; e.g., a cost of adding new pod replicas to a workload or a cost of increasing the resource allocation of pods. The cost ceiling can be used to determine how to scale the workload, including adjusting the resource allocation and the target resource utilization based on collected metrics. In one example, it can be preferable to increase the target resource utilization and provide less headroom in order to meet the cost requirement for the environment. The limited headroom can be a necessary risk that the company is willing to incur in order to meet budgetary restraints. The cost ceiling and other considerations can be configured by a user. The incorporation of determined constraints allows for customization of the application workloads while taking advantage of the responsive, integrated vertical and horizontal scaling methods described herein. According to some embodiments, the configurations can be incorporated as constraints on a machine learning model.

In one embodiment, the configuration of resource allocation and target resource utilization can include adjustments to resource allocation and target resource utilization over time. For example, the resource allocation can be steadily increased over time in anticipation of growing traffic to a site. The resource allocation can also be increased over time based on the anticipated and/or predicted traffic and/or previous metrics. In one example, resource allocation and/or target resource utilization can be configured based on a schedule specified by a user. For example, the resource allocation can be increased and a workload can be upscaled in anticipation of a spike in traffic that can be predicted based on metrics or application-specific metrics. The resource allocation can then be decreased and the workload downscaled after the spike is over in order to prevent wasted resources. According to one embodiment, analysis of the metrics can also be used to dynamically set additional parameters related to container deployment and scaling. For example, the parameters can include the node type to run a container on, the amount of concurrency used by the workload, or how to configure the garbage collection for the application.

In one embodiment, the present disclosure can integrate vertical scaling and horizontal scaling as simultaneous and compatible processes such that the two scaling methods do not interfere with each other. In one embodiment, the workload can be monitored to determine an updated resource allocation and target resource utilization based on metrics as has been described herein. The pods can be vertically scaled according to the updated resource allocation. A horizontal pod autoscaler (HPA) can then be configured with the adjusted target resource utilization and can adjust the workload, with the newly scaled pods, according to the adjusted target resource utilization. The HPA can monitor usage metrics of the workload and determine whether the resource usage of the pods is meeting the updated target resource utilization. The HPA can upscale and downscale the workload according to the resource usage and the updated target resource utilization. The pods that are added or removed are configured with the updated resource allocation. Advantageously, the methods disclosed herein enable the combination of vertical scaling and horizontal scaling when a horizontal scaler is already in place. For example, the vertical scaling can be implemented with a standard HPA without affecting how the standard HPA scales the workload.

In typical cluster management systems, horizontal scaling is based on a set target resource utilization. Pods are added to and removed from a workload based on the set target resource utilization. In the present disclosure, the target resource utilization can be dynamically adjusted based on the usage metrics. The dynamic target resource utilization can be provided as a recommendation for horizontal scaling. For example, a workload can be vertically scaled with an updated resource allocation. An existing HPA for the workload can be configured with the dynamic target resource utilization that was determined along with the updated resource allocation. The HPA can execute horizontal scaling independently of the vertical scaling and can scale the workload horizontally according to the dynamic target resource utilization. The workload can then be assessed while it is being scaled horizontally to continuously update the resource allocation and dynamic target resource utilization. The present method enables the configuration and reconfiguration of horizontal scaling while the workload is running and while the resource allocation of the workload is also being continuously adjusted. The tandem configuration of the resource allocation and the dynamic target resource utilization according to the present method enables simultaneous horizontal scaling. The dynamic target resource utilization is determined as a function of the updated resource allocation. As a result, the HPA is configured to scale the workload according to a parameter that takes into account the adjusted resource allocation of the pods. The HPA can thus scale the workload horizontally in tandem with the vertical scaling of the workload rather than scaling the workload in a way that interferes with the effect of the vertical scaling. The vertical scaling and the horizontal scaling can be configured to maintain a desired headroom in the workload as determined from analysis of collected metrics. The workload can be scaled horizontally based on a dynamic target resource utilization that more accurately fits the needs of the workload. The combination of vertical scaling and horizontal scaling as enabled in the present disclosure can result in more accurate and agile configuration of a workload without interference between the scaling processes. The resource allocation, target resource utilization, and number of pods can all be adjusted based on immediate metrics collected while the cluster is running. Each scaling step is based on analysis of the actual resource usage of the workload.

In some embodiments, the activity of the HPA can depend on a minimum and/or maximum number of allowable pod replicas in a workload. The minimum or maximum number of replicas can be a configuration of the workload that is set by a host. In an exemplary implementation, the HPA can scale the workload by adding replicas until the configured maximum number of pods is reached. The HPA can then cease adding more replicas in order to prevent surpassing the maximum limit that has been set on the workload. Similarly, a workload can be configured with a minimum number of allowable pod replicas. The HPA can downscale the workload by removing replicas until the minimum number of pods is reached. The HPA can then cease to remove more replicas in order to prevent shrinking the workload below a desired size. In some embodiments, the minimum and/or maximum number of pod replicas can be an input or factor in the machine learning-based analysis of metrics and determination of workload resource allocation and scaling, to focus on making vertical scaling changes that prevent the HPA from saturating and allowing the number of replicas to vary with the resource usage of the workload.

The horizontal scaling of the workload can be based on one or more metrics related to the workload. For example, the HPA can scale the workload based on a first metric of resource usage and a second metric of pod activity (e.g., idle workers in a web server). As a non-limiting example, the second metric can be a metric of resource usage or can be a different measure of activity. In one embodiment, the dynamic target resource utilization of the workload can be determined for the first metric configured for the HPA, leaving the other non-resource usage metrics untouched. The second metric can still be used by the HPA but may or may not be a factor in determining the number of replicas for the workload. In this manner, the HPA can take into consideration multiple factors that can affect the performance of the application during scaling. In one embodiment, the machine learning can also determine the target value (e.g., number of idle workers in a web server) at which the second (non-resource usage) metric scales up or down and configure the HPA with the determined target value.

In one embodiment, the timing of vertical and horizontal scaling can be configured such that the two scaling methods do not interfere with each other. For example, vertical scaling can first determine an updated resource allocation and an updated target resource utilization. The HPA can be configured with the updated target resource utilization. The HPA can monitor the workload and check whether changes to the workload are needed throughout a horizontal scaling window. For example, the HPA can monitor the resource usage of the workload and compare the resource usage to the updated target resource utilization. In one embodiment, the HPA can check the workload at least once per minute. The HPA can then scale the workload horizontally based on the updated target resource utilization by adding or removing pod replicas. In one embodiment, the vertical scaling can be executed less frequently than horizontal scaling. For example, the workload can be assessed to update the resource allocation and the target resource utilization (vertical scaling) once every hour or once every few hours. In one implementation, the resource allocation and the target resource utilization can be updated once a day. The frequency of vertical scaling can be manually configured or can be dynamically adjusted while the workload is running. The horizontal scaling can be implemented at least once per minute in between rounds of vertical scaling.

As an illustrative example, the workload can be scaled iteratively based on resource usage. The pods in a workload can first be scaled vertically to modify resource allocation to each of the pods based on workload metrics. For example, the resource allocation for each pod can first be increased. The target resource utilization for the workload can also be modified based on the metrics and the modified resource allocation. The modified target resource utilization can be passed as a configuration metric to the HPA. The HPA can evaluate resource utilization of the pods relative to the modified target resource utilization. If the resource utilization is greater than the modified target resource utilization, a first set of pods can be added by the HPA. The additional first set of pods can be replicated from the existing pods with the modified resource allocation. The resource utilization of the pods, including the additional first set of pods, can be reevaluated by the HPA. If the resource utilization of the pods is still greater than the modified target resource utilization, the HPA can add a second set of pods. At a later point, the resource allocation and the target resource utilization of the pods can be adjusted based on collected metrics in another vertical scaling step. The HPA can then be configured with the new target resource utilization and evaluate the pods for horizontal scaling accordingly.

According to one example, if a certain number of pods (e.g., a minimum or maximum) in a workload is reached during the iterative horizontal scaling, the method can transition from horizontal scaling to vertical scaling to update the resource allocation. The HPA will then continue to scale the workload horizontally based on the updated resource allocation. The workload can be continuously configured using the integrated approach to vertical scaling and horizontal scaling. According to some embodiments, the timing of vertical and horizontal scaling (e.g., the duration of the horizontal scaling window) can be configured based on the speed and/or computational efficiency with which the cluster can be scaled vertically or horizontally. For example, if there are many pods in the workload, it may be more efficient to scale the workload horizontally rather than vertically. Thus, the horizontal scaling can account for more of the adjustments made to the cluster than vertical scaling. In contrast, a smaller cluster can be scaled vertically in smaller increments more efficiently. The increments for vertical and horizontal scaling and the frequency of vertical and horizontal scaling can be dependent on the size of the workload or other characteristics of the workload. In one embodiment, it can be desired that a cluster is adjusted using an equal distribution of vertical scaling and horizontal scaling.

According to one embodiment, the savings and other changes that would be provided by the scaling recommendations can be estimated without deploying the scaling recommendation. The scaling recommendations can include, for example, an updated resource allocation and an updated target resource utilization. In one embodiment, the present method can include generating a model of the workload and/or the resource usage of the workload to estimate how the scaling recommendations would affect the workload. According to some embodiments, machine learning can be used to generate the model and/or generate predictions of how the scaling recommendations would affect the workload. The predictions can include, for example, predicted resource usage metrics and/or operating costs that would result if the scaling recommendations were to be implemented in the workload. The model and predictions can be used to help the user understand and trust the new scaling recommendations before reconfiguring the workload. In one embodiment, the model and/or the predictions can be generated according to desired user configurations or parameters, which can be input into the model. For example, the predictions can include a prediction for how the cost of maintaining the application would change if the scaling recommendations were implemented.

Figure 2:
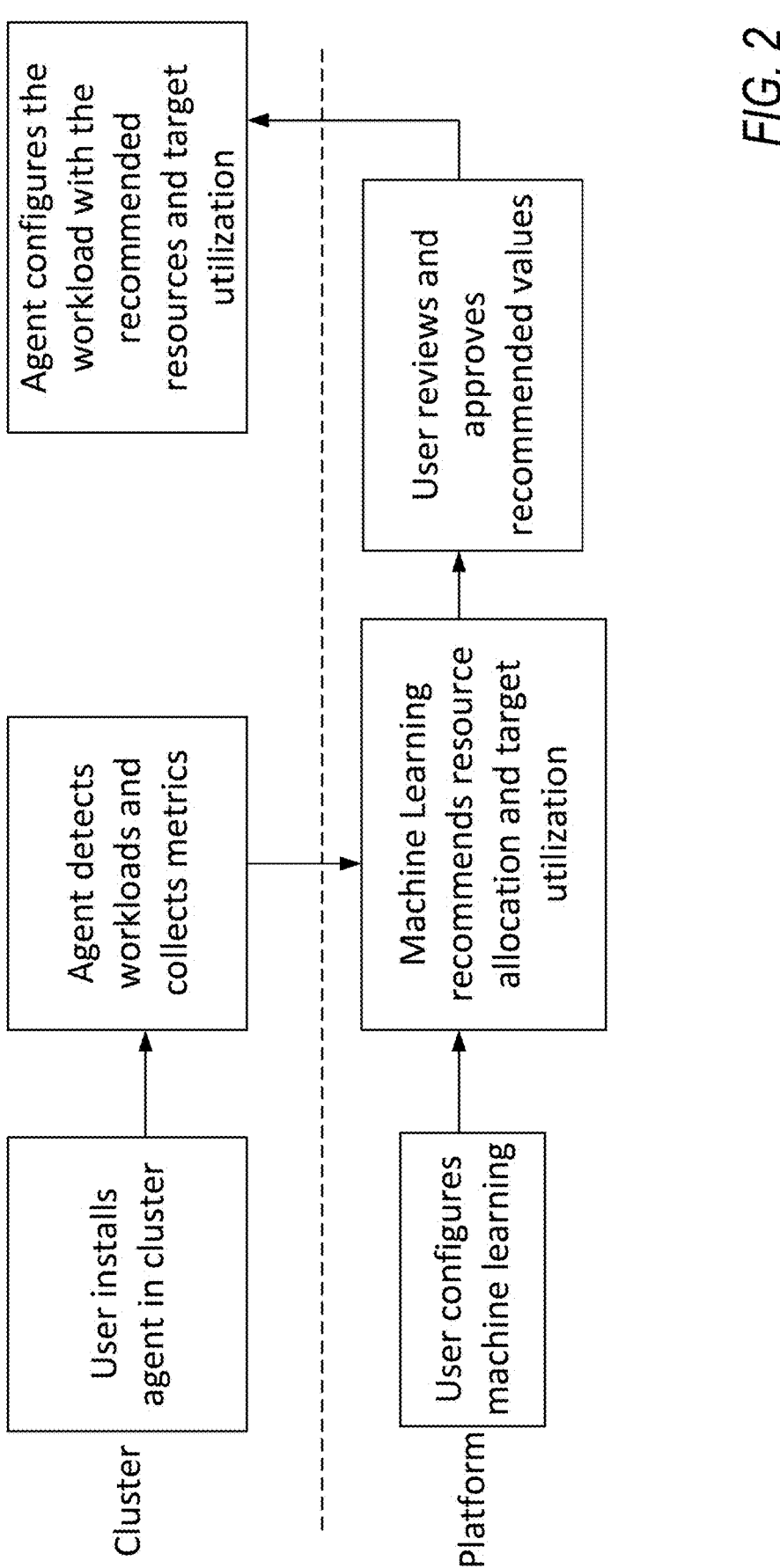
FIG. 2 is a flowchart showing the workflow for a method, according to an exemplary embodiment of the present disclosure.

FIG. 2 illustrates a workflow for scaling a workload. The machine learning can be configured by a user to guide the resource setting recommendations of the machine learning. The agent for scaling the workload can be installed in a cluster. The agent can detect workloads in the cluster and collect metrics from the workloads. The metrics collected by the agent can be used in the machine learning algorithm to determine a recommended resource allocation and dynamic target resource utilization for the workload. The recommendation can then be reviewed and approved by a user. Once the user has approved the recommendation, the agent can configure the workload with the recommended resource allocation and target resource utilization. In some embodiments, the recommended resource allocation and target resource utilization can be applied automatically to the workload without receiving explicit approval provided that the recommendation lies within user-specified guardrails.

According to an illustrative example, a cluster can host an application for financial investments. The application can experience increases in traffic and activity at the start of business hours, when a stock exchange opens. If the application handles financial investments for more than one market, the application can experience increases in traffic and activity when stock exchanges in different time zones open. The activity can then decrease after the initial spike because users have completed their daily transactions. In addition, the application can also experience sudden increases in activity at random times. For example, a publicly traded company can announce an acquisition of a competitor. A large number of users may buy or sell stocks right after the announcement is released. Delays or failures due to container resource issues can have serious financial consequences for users of the application. Thus, the workloads hosting the application should be configured with enough headroom to handle sudden increases in activity while also handling periodic changes in traffic. According to one embodiment of the present disclosure, metrics can be collected and analyzed to determine how to scale the workloads appropriately. In one embodiment, the analysis of the metrics can include identifying when increases in traffic may occur and how much activity occurs during the increases in traffic. The analysis of the metrics can also include identifying excess headroom that is not used even when the increases in traffic occur. The pods of the workload can be vertically scaled based on the metrics to convert and redistribute excess headroom. For example, the CPU and memory allocated to each pod can be modified. An updated target resource utilization can also be determined based on the metrics and the new resource allocation. The updated target resource utilization can be a utilization of the modified CPU and memory allocated to each pod. The workload can then be horizontally scaled according to the updated target resource utilization. For example, an HPA can analyze the metrics and create more pod replicas, wherein the new pod replicas are configured with the modified CPU and memory allocation. The goal of increasing the number of pods is to modify the resource utilization of each pod to match the target resource utilization. The target resource utilization of each pod can be configured to leave enough headroom in each pod to handle sudden increases in traffic while minimizing excess headroom. In one example, the target resource utilization can be determined based on previous spikes in traffic or an active userbase of the application. In one embodiment, the pods in the workload can be downscaled at a later time if necessary. For example, the application can experience fewer requests during the midday hours after the markets have been open for some time. The resources allocated to the pods can be downscaled. Additionally or alternatively, pods in the cluster can be taken offline or destroyed to decrease the number of pods in the cluster. The combination of vertical scaling and horizontal scaling can make the environment more responsive to changes in application traffic while leaving enough head-room for unpredictable changes.

Embodiments of the subject matter and the functional operations described in this specification can be implemented by digital electronic circuitry, in tangibly embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of data processing apparatus. The computer storage medium can be a machine-readable storage device, a machine-readable storage substrate, a random or serial access memory device, or a combination of one or more of them.

The term "data processing apparatus" refers to data processing hardware and may encompass all kinds of apparatus, devices, and machines for processing data, including by way of example a programmable processor, a computer, or multiple processors or computers. The apparatus can also be or further include special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, Subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA an ASIC.

Computers suitable for the execution of a computer program include, by way of example, general or special purpose microprocessors or both, or any other kind of central processing unit. Generally, a CPU will receive instructions and data from a read-only memory or a random access memory or both. Elements of a computer are a CPU for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more Such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients (user devices) and servers. A client and server are generally remote from each other and typically interact through a communication network. The relationship of client and server arises by virtue of computer programs running on the respective computers and having a client-server relationship to each other. In an embodiment, a server transmits data, e.g., an HTML page, to a user device, e.g., for purposes of displaying data to and receiving user input from a user interacting with the user device, which acts as a client. Data generated at the user device, e.g., a result of the user interaction, can be received from the user device at the server.

Figure 3:
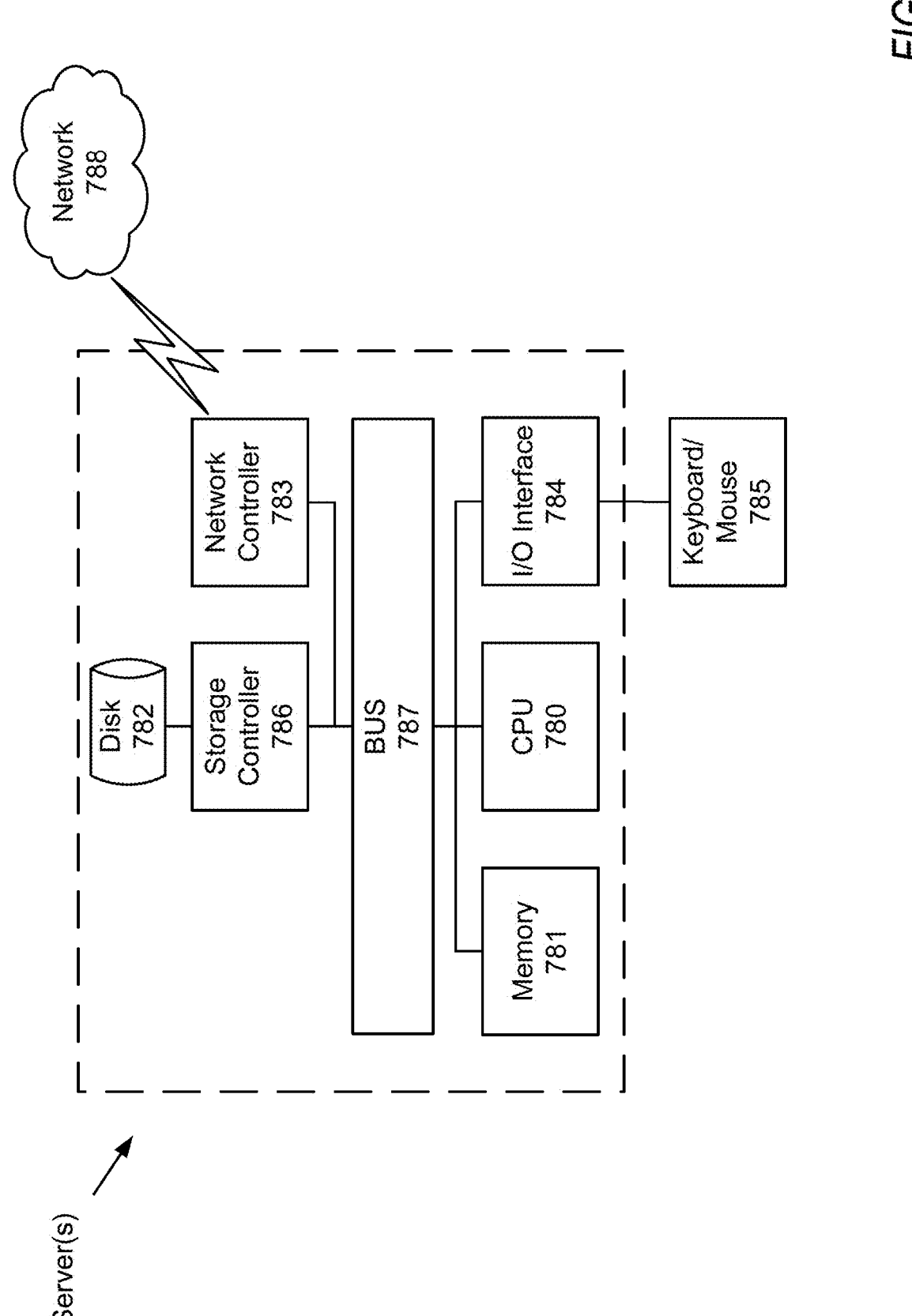
FIG. 3 is a schematic of a hardware configuration of a device for performing a method, according to an exemplary embodiment of the present disclosure.

Next, a hardware description of a server, including the machine learning module, according to exemplary embodiments of the present disclosure, is described with reference to FIG. 3. In FIG. 3, the server includes a CPU 780 which performs the processes described above/below. The process data and instructions may be stored in memory 781. These processes and instructions may also be stored on a storage medium disk 782 such as a hard drive (HDD) or portable storage medium or may be stored remotely. Further, the claimed advancements are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the server communicates, such as other servers or machines.

Further, the claimed advancements may be provided as a utility application, background daemon, or component of an operating system, or combination thereof, executing in conjunction with CPU 780 and an operating system such as Microsoft Windows 7, Microsoft Windows 10, UNIX, Solaris, LINUX, Apple MAC-OS, and other systems known to those skilled in the art.

The hardware elements in order to achieve the server may be realized by various circuitry elements, known to those skilled in the art. For example, CPU 780 may be a Xenon or Core processor from Intel of America or an Opteron processor from AMD of America, or may be other processor types that would be recognized by one of ordinary skill in the art. Alternatively, the CPU 780 may be implemented on an FPGA, ASIC, PLD or using discrete logic circuits, as one of ordinary skill in the art would recognize. Further, CPU 780 may be implemented as multiple processors cooperatively working in parallel to perform the instructions of the inventive processes described above.

The server in FIG. 3 also includes a network controller 783, such as an Intel Ethernet PRO network interface card from Intel Corporation of America, for interfacing with network 788. It can be appreciated that the network 788 can be a public network, such as the Internet, or a private network such as an LAN or WAN network, or any combination thereof, and can also include PSTN or ISDN sub-networks. The network 788 can also be wired, such as an Ethernet network, or can be wireless such as a cellular network including EDGE, 3G and 4G wireless cellular systems. The wireless network can also be WiFi, Bluetooth, or any other wireless form of communication that is known.

In certain embodiment, the server is connected to or functions as a computer terminal. To this end, the server may further include a general purpose I/O interface 784 that interfaces with a keyboard and/or mouse 785 as well as a touch screen panel on or separate from a display. The general purpose I/O interface 784 may also connect to a variety of peripherals, as necessary.

The general purpose storage controller 786 connects the storage medium disk 782 with communication bus 787, which may be an ISA, EISA, VESA, PCI, or similar, for interconnecting all of the components of the server. A description of the general features and functionality of the display, keyboard and/or mouse 785, as well as a display controller, storage controller 786, network controller 783, and general purpose I/O interface 784 is omitted herein for brevity as these features are known.

While this specification contains many specific implementation details, these should not be construed as limitations on the scope of what may be claimed, but rather as descriptions of features that may be specific to particular embodiments.

Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

Obviously, numerous modifications and variations are possible in light of the above teachings. It is therefore to be understood that within the scope of the appended claims, embodiments of the present disclosure may be practiced otherwise than as specifically described herein.

Embodiments of the present disclosure may also be set forth in the following parentheticals.

(1) A method for rightsizing an application, comprising: analyzing, via processing circuitry, metrics from containers in the application; determining, via the processing circuitry, a resource allocation and a target resource utilization for an application workload based on the metrics; and configuring, via the processing circuitry, the application workload based on the resource allocation, the target resource utilization, and the metrics.

(2) The method of (1), wherein the metrics are collected from deployed containers and analyzed using machine learning to determine the resource allocation and the target resource utilization for the application workload.

(3) The method of (1) to (2), further comprising receiving a configuration input from a user, wherein the machine learning is configured based on the configuration input.

(4) The method of (1) to (3), wherein the resource allocation and the target resource utilization are determined in tandem and wherein the determination of the target resource utilization is used for simultaneous horizontal scaling of the application workload.

(5) The method of (1) to (4), further comprising generating, using machine learning, a prediction of resource usage metrics and operating costs based on the determined resource allocation and the determined target resource utilization before configuring the application workload.

(6) The method of (1) to (5), further comprising continuously and automatically configuring the application workload with the determined resource allocation and the determined target resource utilization.

(7) A device comprising: processing circuitry configured to: analyze metrics from containers in an application, determine a resource allocation and a target resource utilization for an application workload based on the metrics, and configure the application workload based on the resource allocation, the target resource utilization, and the metrics.

(8) The device of (7), wherein the metrics are collected from deployed containers and analyzed using machine learning to determine the resource allocation and the target resource utilization for the application workload.

(9) The device of (7) to (8), wherein the processing circuitry is further configured to receive a configuration input from a user, wherein machine learning is configured based on the configuration input.

(10) The device of (7) to (9), wherein the resource allocation and the target resource utilization are determined in tandem and wherein the determination of the target resource utilization is used for simultaneous horizontal scaling of the application workload.

(11) The device of (7) to (10), wherein the processing circuitry is further configured to generate, using machine learning, a prediction of resource usage metrics and operating costs based on the resource allocation and the target resource utilization before configuring the application.

(12) The device of (7) to (11), wherein the processing circuitry is further configured to continuously and automatically configure the application workload with the determined resource allocation and the determined target resource utilization.

(13) A non-transitory computer-readable storage medium for storing computer-readable instructions that, when executed by a computer, cause the computer to perform a method, the method comprising: analyzing metrics from containers in an application; determining a resource allocation and a target resource utilization for an application workload based on the metrics; and configuring the application workload based on the resource allocation, the target resource utilization, and the metrics.

(14) The non-transitory computer-readable storage medium of (13), wherein the metrics are collected from deployed containers and analyzed using machine learning to determine the resource allocation and the target resource utilization for the application workload.

(15) The non-transitory computer-readable storage medium of (13) to (14), further comprising receiving a configuration input from a user, wherein the machine learning is configured based on the configuration input.

(16) The non-transitory computer-readable storage medium of (13) to (15), wherein the resource allocation and the target resource utilization are determined in tandem and wherein the determination of the target resource utilization is used for simultaneous horizontal scaling of the application workload.

(17) The non-transitory computer-readable storage medium of (13) to (16), further comprising generating, using machine learning, a prediction of resource usage metrics and operating costs based on the determined resource allocation and the determined target resource utilization before configuring the application workload.

(18) The non-transitory computer-readable storage medium of (13) to (17), further comprising continuously and automatically configuring the application workload with the determined resource allocation and the determined target resource utilization.

Thus, the foregoing discussion discloses and describes merely exemplary embodiments of the present disclosure. As will be understood by those skilled in the art, the present disclosure may be embodied in other specific forms without departing from the spirit thereof. Accordingly, the disclosure of the present disclosure is intended to be illustrative, but not limiting of the scope of the disclosure, as well as other claims. The disclosure, including any readily discernible variants of the teachings herein, defines, in part, the scope of the foregoing claim terminology such that no inventive subject matter is dedicated to the public.

The invention claimed is:

1. A method for rightsizing an application, comprising:
acquiring, via processing circuitry, one or more metrics from containers in the application;
determining both a resource allocation and a target resource utilization corresponding to an application workload of the application by inputting the acquired one or more metrics to a machine-learning model, the machine-learning model being configured to simultaneously output both (1) a recommended resource allocation indicating a number of allocated resources, and (2) a recommended target resource utilization indicating a target percentage usage of each allocated resource, the recommended resource allocation and the recommended target resource utilization being determined in tandem by the machine-learning model; and
automatically configuring, via the processing circuitry, the application workload based on the determined resource allocation, the determined target resource utilization, and the acquired one or more metrics.

2. The method of claim 1, wherein the acquired one or more metrics are collected from deployed containers and analyzed by the machine-learning model simultaneously to determine both the resource allocation and the target resource utilization for the application workload.

3. The method of claim 2, further comprising receiving a configuration input from a user, wherein the machine-learning model is configured based on the configuration input.

4. The method of claim 1,
wherein the determination of the target resource utilization is used for simultaneous horizontal scaling of the application workload.

5. The method of claim 1, further comprising generating, using machine learning, a prediction of resource usage metrics and operating costs based on the determined resource allocation and the determined target resource utilization before configuring the application workload.

6. The method of claim 1, further comprising continuously and automatically configuring the application workload with the determined resource allocation and the determined target resource utilization.

7. The method of claim 1, wherein the acquired one or more metrics input to the machine-learning model include a number of replicas, a maximum number and a minimum number of allowable replicas, and a number and a type of metrics used by a horizontal autoscaler.

8. A device, comprising:
processing circuitry configured to:
acquire one or more metrics from containers in an application,
determine both a resource allocation and a target resource utilization corresponding to an application workload of the application by inputting the acquired one or more metrics to a machine-learning model, the machine-learning model being configured to simultaneously output both (1) a recommended resource allocation indicating a number of allocated resources, and (2) a recommended target resource utilization indicating a target percentage usage of each allocated resource, the recommended resource allocation and the recommended target resource utilization being determined in tandem by the machine-learning model, and automatically configure the application workload based on the determined resource allocation, the determined target resource utilization, and the acquired one or more metrics.

9. The device of claim 8, wherein the acquired one or more metrics are collected from deployed containers and analyzed by the machine learning model simultaneously to determine both the resource allocation and the target resource utilization for the application workload.

10. The device of claim 9, wherein the processing circuitry is further configured to receive a configuration input from a user, wherein the machine-learning model is configured based on the configuration input.

11. The device of claim 8, wherein the determination of the target resource utilization is used for simultaneous horizontal scaling of the application workload.

12. The device of claim 8, wherein the processing circuitry is further configured to generate, using machine learning, a prediction of resource usage metrics and operating costs based on the determined resource allocation and the determined target resource utilization before configuring the application.

13. The device of claim 8, wherein the processing circuitry is further configured to continuously and automatically configure the application workload with the determined resource allocation and the determined target resource utilization.

14. A non-transitory computer-readable storage medium for storing computer-readable instructions that, when executed by a computer, cause the computer to perform a method, the method comprising:

acquiring one or more metrics from containers in an application;

determining both a resource allocation and a target resource utilization corresponding to an application workload of the application by inputting the acquired one or more metrics to a machine-learning model, the machine-learning model being configured to simultaneously output both (1) a recommended resource allocation indicating a number of allocated resources, and (2) a recommended target resource utilization indicating a target percentage usage of each allocated resource, the recommended resource allocation and the recommended target resource utilization being determined in tandem by the machine-learning model; and automatically configuring the application workload based on the determined resource allocation, the determined target resource utilization, and the acquired one or more metrics.

15. The non-transitory computer-readable storage medium of claim 14, wherein the acquired one or more metrics are collected from deployed containers and analyzed simultaneously by the machine-learning model to determine the resource allocation and the target resource utilization for the application workload.

16. The non-transitory computer-readable storage medium of claim 15, further comprising receiving a configuration input from a user, wherein the machine-learning model is configured based on the configuration input.

17. The non-transitory computer-readable storage medium of claim 14, wherein the determination of the target resource utilization is used for simultaneous horizontal scaling of the application workload.

18. The non-transitory computer-readable storage medium of claim 14, further comprising generating, using machine learning, a prediction of resource usage metrics and operating costs based on the determined resource allocation and the determined target resource utilization before configuring the application workload.

19. The non-transitory computer-readable storage medium of claim 14, further comprising continuously and automatically configuring the application workload with the determined resource allocation and the determined target resource utilization.

* * * * *